Feb. 18, 1936.　　　H. C. GIELOW　　　2,030,864
INSIDE MICROMETER CENTERING DEVICE
Filed Oct. 26, 1934
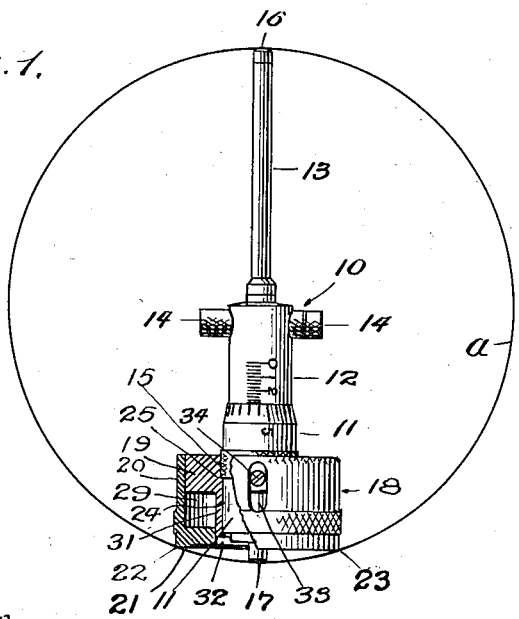
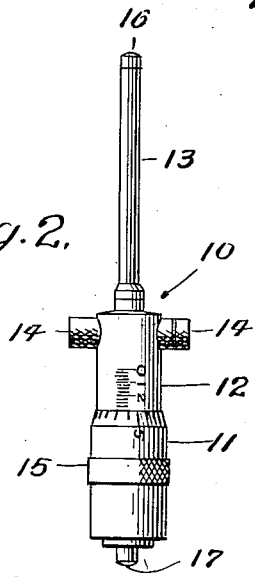
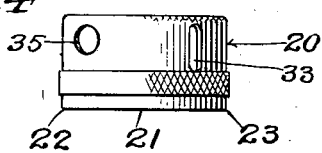
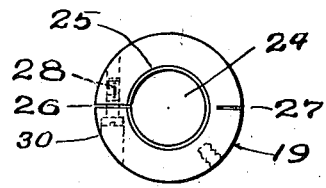
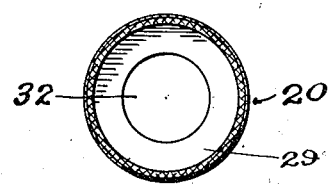
Inventor:
Harry C. Gielow.
By Charles O. Shurvey
His Atty.

Patented Feb. 18, 1936

2,030,864

UNITED STATES PATENT OFFICE 2,030,864

INSIDE MICROMETER CENTERING DEVICE

Harry C. Gielow, Elgin, Ill., assignor to The L. S. Starrett Company, Athol, Mass., a corporation of Massachusetts Application October 26, 1934, Serial No. 750,126

7 Claims. (Cl. 33—178)

This invention relates to inside micrometer centering devices, and its principal object is to provide a device which may be readily attached to an inside micrometer for facilitating the taking of accurate measurement of the internal diameter of cylinders or other bores.

Workmen experience considerable difficulty in accurately locating an inside micrometer along the center or diametrical line of a cylinder or other bore in taking measurements of the bore and heretofore they have depended on their skill and judgment in locating the micrometer when taking such measurements.

In accordance with the present invention, I provide a cylindrical base which surrounds the barrel of the micrometer and co-operates with the internal cylindrical face of a bored object (when placed against the same) to locate the axis of the micrometer in coincidence with the radius line or diameter of the cylinder, thereby eliminating the necessity for the workmen to depend on his judgment to accurately locate the micrometer when taking internal dimensions.

Another object is to provide a centering device which may be constructed to fit and be readily applied to standard inside micrometers, thereby adapting them for use in taking accurate internal cylindrical dimensions.

With these and other objects and advantages in view, this invention consists in the several novel features hereinafter fully set forth and claimed.

The invention is clearly illustrated in the drawing accompanying this specification in which:

Fig. 1 is a side elevation of an inside micrometer equipped with a centering device embodying a simple form of the present invention;

Fig. 2 is a side elevation of the inside micrometer shown in Fig. 1;

Fig. 3 is a side elevation of an attaching sleeve which forms part of the device;

Fig. 4 is a side elevation of a collar which comprises the other member of the device;

Fig. 5 is a plan of the attaching sleeve and

Fig. 6 is a plan of the collar.

Referring to said drawing, the reference character 10 designates an inside micrometer of standard make, having the usual barrel 11, micrometer sleeve 12 and removable measuring rod 13.

The micrometer sleeve and barrel have the usual threaded connections with each other and are provided with graduation marks as is customary. Projecting from the micrometer sleeve are knurled studs 14, one of which is threaded in the micrometer sleeve and acts as a set screw for holding the measuring rod in place. A slightly raised rib 15 is formed on the barrel, which rib is knurled as usual. On the outer end of the measuring rod is a contact point 16 and projecting from the opposite end of the barrel is a contact point 17. As is well understood the measurements are taken by bringing the two contact points into contact with diametrically opposite points on the face of the bore. The readings on the scale indicate decimal parts of an inch as is well understood. Measuring rods of various lengths usually accompany inside micrometers and provide means for measuring large and small cylindrical bores. The exact form of inside micrometer described is not necessary to this invention, broadly considered, but it has been chosen for the purposes of illustration only.

Removably mounted on one end of the barrel 11 is a base 18, which comprises a sleeve 19 clamped on the barrel and a collar 20 slidably mounted on the sleeve 19 and having a limited amount of movement in an axial direction.

The end face 21 of the collar is circular and is disposed exactly at right angles to the axis of the collar. The micrometer 10, sleeve 19 and collar 20 are disposed in co-axial alignment so that any two diametrically opposite points, for example points 22, 23, at the corner between the external cylindrical face of the collar and its end face 21, when placed against the internal cylindrical face of any object serve to locate the longitudinal axis of the micrometer precisely in alignment with the radius line or the diametrical line of a cylinder, as is shown in Fig. 1 in which the line, a, may designate the circle which defines the cylindrical bore of an object. The sliding connection between the collar and sleeve enables the device to be used in locating the micrometer when measuring bores of any diameter.

The sleeve 19 has an axial bore 24 for receiving one end of the micrometer, and the bore is enlarged a trifle at one end to form a shoulder 25 that acts as a seat for the rib 15. The sleeve is split through its body as at 26, and split part way through as at 27 to weaken it at that point, and the parts of the sleeve adjacent the slit 26 are connected by a clamp screw 28 whereby the sleeve may be rigidly clamped upon the barrel of the micrometer.

The collar 20 is bored axially part way through its body to form a socket 29 in which the sleeve 19 is received. Only enough clearance is left between the sleeve and internal cylindrical face of the socket 29 to permit free sliding movement of the collar on the sleeve. The socket is made somewhat deeper than the thickness of the head part 30 of the sleeve whereby the collar may be adjusted in an axial direction along the sleeve. Desirably the sleeve is formed with an axially disposed neck 31 through which the bore 24 extends and said neck enters an axially disposed hole 32 in the end wall 21 of the collar.

The sleeve 19 is connected to the collar 20 in such manner that it will rotate therewith, while permitting the collar to be moved axially thereof, and as shown the collar is formed with a slot 33 in its wall into which extends a pin or screw 34 that is threaded in the head of the sleeve. The pin and slot connection also prevents the collar from becoming disconnected from the sleeve. A hole 35 in the wall of the collar registers with the head of the clamp screw 28 and furnishes access thereto by a screw driver when clamping the sleeve to the barrel of the micrometer or unclamping it therefrom.

When using an inside micrometer, equipped with the present centering device, to measure the diameters of cylinders or other bores, the workman grasps the micrometer between two fingers of one hand and brings the instrument into the bore of the object, pressing two opposite points of the circular end face of the collar against the cylindrical face of the bore and thereby aligning the axis of the micrometer with the diameter of the bore or cylinder. He then rocks the instrument on the points of contact between the collar and cylinder face, thereby moving the micrometer through a plane which coincides with the axis of the cylinder, and determines by the contact between the contact points 16, 17 and the cylindrical face of the bore whether the diameter is correct or not. By turning the micrometer sleeve 12 of the micrometer until the two contact points 16, 17 touch the diametrically opposite points on the cylinder face the workman can observe by looking at the scale on the micrometer how nearly correct the diameter is.

The instrument is very useful in connection with the work of regrinding cylinder bores, although its use is not limited thereto. In measuring the bore, the micrometer is set for the exact diameter required, and the instrument is used as before described. If the contact points bind on the cylinder face the workman knows that the diameter is too small, and when the two contact points just touch opposite points on the cylindrical face he knows that the bore is of the exact dimension required.

The device also serves as a flat base by which the micrometer may be used as a height gauge in taking measurements since it holds the micrometer at exactly right angles to the surface upon which it is stood.

I claim as new and desire to secure by Letters Patent:

1. The combination with an inside micrometer, of a sleeve disposed in co-axial alignment with and clamped upon the barrel of the micrometer, and a collar disposed in co-axial alignment with the micrometer and sleeve and mounted thereon for movement in an axial direction, said collar having a circular end face disposed at right angles to the axis of the micrometer for the purpose set forth.

2. A centering device for inside micrometers, comprising a sleeve provided with means for clamping the same on the barrel of an inside micrometer, in co-axial alignment therewith, a collar mounted on said sleeve in co-axial alignment with the micrometer and sleeve, and means providing a limited amount of movement of the collar on the sleeve along the length of the micrometer, said collar having a circular end face disposed at right angles to the axis of the micrometer.

3. A centering device for inside micrometers, comprising a sleeve having a split therein and a clamp screw for clamping the sleeve on the barrel of an inside micrometer, in co-axial alignment therewith, a collar having a bore in which said sleeve is received and having also a circular end face co-axial with the axis of the micrometer and disposed at right angles thereto, and a pin and slot connection between the sleeve and collar.

4. A centering device for inside micrometers, comprising a split sleeve having a clamping screw for rigidly clamping the sleeve on the barrel of an inside micrometer, in co-axial alignment therewith, a collar co-axial with the micrometer and sleeve, surrounding the sleeve, and means providing a limited amount of movement of the collar on the sleeve along the length of the micrometer, said collar having a circular end face extending at right angles to the axis of the micrometer and co-axial therewith.

5. A centering device for inside micrometers, comprising a sleeve disposed co-axially with the axis of the barrel of an inside micrometer and clamped thereon, said sleeve having a reduced neck surrounding said barrel, a collar mounted on said sleeve in co-axial alignment with the micrometer and sleeve and having a circular end wall formed with a central aperture for receiving said reduced neck of the sleeve, said end wall being disposed at right angles to the axis of the micrometer, and a pin and slot connection between the sleeve and collar affording a limited amount of movement of the collar on the sleeve in an axial direction.

6. The combination with an inside micrometer comprising a barrel having a contact point at one end, and a micrometer sleeve having a contact point at the other end, said barrel, micrometer sleeve and contact points being in co-axial alignment, of a collar disposed in co-axial alignment with the barrel and mounted for movement relative thereto in a direction lengthwise thereof, said collar having a circular end face disposed at right angles to the axis of the micrometer and serving, when any two diametrically opposite places on the circular edge of the end face of the collar are placed against the cylindrical face of a bore, to locate the axis of the micrometer in coincidence with the diameter of the bore, and any of said diametrically opposite places on the circular edge of the collar directing rocking movements of the micrometer along the centre of the bore.

7. The combination with an inside micrometer having a contact point at each end, of a collar disposed in co-axial alignment with the micrometer and mounted for sliding movement relative thereto in a direction lengthwise thereof, said collar having a circular end face disposed at right angles to the axis of the micrometer and serving, when any two diametrically opposite places on said circular edge are placed against the cylindrical face of a bore, to locate the axis of the micrometer in coincidence with the diameter of the bore, and serving to direct rocking movement of the micrometer along the diameter of the bore.

HARRY C. GIELOW.